US 9,310,766 B2

United States Patent
Bolle et al.

(10) Patent No.: US 9,310,766 B2
(45) Date of Patent: Apr. 12, 2016

(54) SECURITY ELEMENT

(75) Inventors: Thomas Bolle, Efringen-Kirchen (DE); Hans Reichert, Rheinfelden (DE); Michelle Richert, Illzach (FR); Igor Zhurminsky, Zug (CH); Marc Schnieper, Onex (CH)

(73) Assignee: BASF SE, Ludwigshafen (DE)

( * ) Notice: Subject to any disclaimer, the term of this patent is extended or adjusted under 35 U.S.C. 154(b) by 372 days.

(21) Appl. No.: 13/823,348

(22) PCT Filed: Sep. 27, 2011

(86) PCT No.: PCT/EP2011/066768
§ 371 (c)(1),
(2), (4) Date: May 1, 2013

(87) PCT Pub. No.: WO2012/041851
PCT Pub. Date: Apr. 5, 2012

(65) Prior Publication Data
US 2013/0208327 A1 Aug. 15, 2013

Related U.S. Application Data

(60) Provisional application No. 61/387,490, filed on Sep. 29, 2010.

(30) Foreign Application Priority Data

Sep. 29, 2010 (EP) .................................... 10182151

(51) Int. Cl.
*G03H 1/00* (2006.01)
*G02B 5/18* (2006.01)
(Continued)

(52) U.S. Cl.
CPC ............. *G03H 1/0011* (2013.01); *B41M 3/144* (2013.01); *B42D 25/29* (2014.10); *G03H 1/0244* (2013.01);
(Continued)

(58) Field of Classification Search
CPC ...... G02B 5/18; G02B 5/1809; G02B 5/1866; G02B 5/1847; G02B 5/1857; G02B 2005/1804; G02B 5/1819; G02B 5/203; G02B 1/115; G03H 1/0011; G03H 1/2202; G03H 1/028; B42D 25/328; B42D 25/00; B42D 25/29; B42D 2033/24; B42D 2033/10
USPC .............. 359/2, 3, 32, 34, 566, 569, 567, 576
See application file for complete search history.

(56) References Cited

U.S. PATENT DOCUMENTS

| | | | |
|---|---|---|---|
| 458,475 | A | 8/1891 | Main |
| 4,913,858 | A | 4/1990 | Miekka et al. |

(Continued)

FOREIGN PATENT DOCUMENTS

| | | |
|---|---|---|
| CN | 1568264 A | 1/2005 |
| EP | 0 420 261 | 4/1991 |

(Continued)

OTHER PUBLICATIONS

U.S. Appl. No. 14/407,706, filed Dec. 12, 2014, Richert, et al.

(Continued)

*Primary Examiner* — Jade R Chwasz
(74) *Attorney, Agent, or Firm* — Oblon, McClelland, Maier & Neustadt, L.L.P.

(57) ABSTRACT

The present invention is in the field of security documents, more particularly in the field of security elements aimed to protect security documents against copying (illegal reproduction) and counterfeiting. It discloses a security element having a security feature which changes its visual appearance after irradiation with light, especially with UV light and at rotation and/or tilting. Security documents comprising said security element, as well as a method for producing said security element, are also disclosed.

26 Claims, 6 Drawing Sheets

Figure 1A:
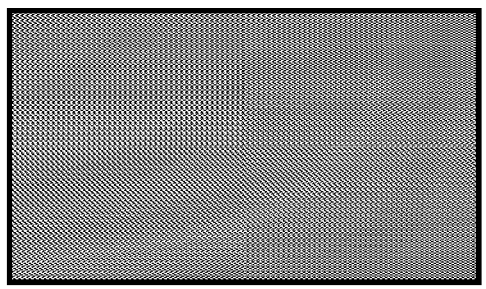
Figure 1A:

(51) Int. Cl.
  *B41M 3/14* (2006.01)
  *G03H 1/02* (2006.01)
  *B42D 25/29* (2014.01)
  *B42D 25/328* (2014.01)
  *B42D 25/387* (2014.01)

(52) U.S. Cl.
  CPC ............ *B42D 25/328* (2014.10); *B42D 25/387* (2014.10); *B42D 2033/04* (2013.01); *G03H 2222/15* (2013.01); *G03H 2240/54* (2013.01)

(56) References Cited

U.S. PATENT DOCUMENTS

| | | | |
|---|---|---|---|
| 5,164,227 | A | 11/1992 | Miekka et al. |
| 6,097,147 | A | 8/2000 | Baldo et al. |
| 6,413,656 | B1 | 7/2002 | Thompson et al. |
| 6,451,415 | B1 | 9/2002 | Forrest et al. |
| 6,451,455 | B1 | 9/2002 | Thompson et al. |
| 6,515,298 | B2 | 2/2003 | Forrest et al. |
| 6,573,651 | B2 | 6/2003 | Adachi et al. |
| 8,015,919 | B2 | 9/2011 | Boswell et al. |
| 8,270,050 | B2 | 9/2012 | Schnieper et al. |
| 8,453,570 | B2 | 6/2013 | Boswell et al. |
| 2002/0100906 | A1 | 8/2002 | Takiguchi et al. |
| 2002/0121638 | A1 | 9/2002 | Grushin et al. |
| 2002/0197511 | A1 | 12/2002 | D'Andrade et al. |
| 2003/0017361 | A1 | 1/2003 | Thompson et al. |
| 2003/0040627 | A1 | 2/2003 | Fujii |
| 2003/0054198 | A1 | 3/2003 | Tsuboyama et al. |
| 2003/0059646 | A1 | 3/2003 | Kamatani et al. |
| 2003/0068526 | A1 | 4/2003 | Kamatani et al. |
| 2003/0068528 | A1 | 4/2003 | Thompson et al. |
| 2003/0068535 | A1 | 4/2003 | Takiguchi et al. |
| 2003/0072964 | A1 | 4/2003 | Kwong et al. |
| 2003/0124381 | A1 | 7/2003 | Thompson et al. |
| 2003/0141809 | A1 | 7/2003 | Furugori et al. |
| 2007/0247714 | A1* | 10/2007 | Schnieper et al. ............ 359/558 |
| 2009/0061159 | A1 | 3/2009 | Staub et al. |
| 2012/0029121 | A1 | 2/2012 | Ormerod et al. |
| 2012/0199994 | A1 | 8/2012 | Richert et al. |
| 2012/0301639 | A1 | 11/2012 | Grigorenko et al. |

FOREIGN PATENT DOCUMENTS

| | | |
|---|---|---|
| EP | 1 238 981 | 9/2002 |
| EP | 1 239 526 | 9/2002 |
| EP | 1 241 022 | 9/2002 |
| EP | 1 244 155 | 9/2002 |
| EP | 1 998 193 | 12/2008 |
| EP | 2 130 884 | 12/2009 |
| EP | 1 776 242 | 10/2011 |
| JP | H07-209848 | 8/1995 |
| JP | H08-262963 | 10/1996 |
| JP | 10-129107 | 5/1998 |
| JP | 10 129107 | 5/1998 |
| JP | 2001-255808 | 9/2001 |
| JP | 2001 255808 | 9/2001 |
| JP | 2001-265198 | 9/2001 |
| JP | 2001 265198 | 9/2001 |
| JP | 2002-72835 | 3/2002 |
| JP | 2002 72835 | 3/2002 |
| JP | 2003 59667 | 2/2003 |
| JP | 2003 73387 | 3/2003 |
| JP | 2003 73388 | 3/2003 |
| JP | 2003 73665 | 3/2003 |
| JP | 2003 248414 | 9/2003 |
| JP | 2003-248414 | 9/2003 |
| JP | 2004 223975 | 8/2004 |
| JP | 2004-223975 | 8/2004 |
| JP | 2007 72188 | 3/2007 |
| JP | 2007-72188 | 3/2007 |
| JP | 2009-117575 | 5/2009 |
| WO | 00 57676 | 9/2000 |
| WO | 00 70655 | 11/2000 |
| WO | 01 39234 | 5/2001 |
| WO | 01 41512 | 6/2001 |
| WO | 01 93642 | 12/2001 |
| WO | 02 15645 | 2/2002 |
| WO | 02 071813 | 9/2002 |
| WO | 02 074015 | 9/2002 |
| WO | WO 03/033274 A1 | 4/2003 |
| WO | 2005 019373 | 3/2005 |
| WO | 2005 051675 | 6/2005 |
| WO | 2005 113704 | 12/2005 |
| WO | 2006 000544 | 1/2006 |
| WO | 2006 018232 | 2/2006 |
| WO | WO 2006/016265 A1 | 2/2006 |
| WO | 2006 056418 | 6/2006 |
| WO | 2007 115970 | 10/2007 |
| WO | 2007 115981 | 10/2007 |
| WO | 2008 000727 | 1/2008 |
| WO | 2008 061930 | 5/2008 |
| WO | 2008 101842 | 8/2008 |
| WO | 2009 077350 | 6/2009 |
| WO | WO 2010/069823 A1 | 6/2010 |
| WO | WO 2011/020727 A1 | 2/2011 |
| WO | WO 2011/064162 A2 | 6/2011 |

OTHER PUBLICATIONS

International Search Report Issued Dec. 19, 2011 in PCT/EP11/66768 Filed Sep. 27, 2011.
U.S. Appl. No. 14/423,843, filed Feb. 25, 2015, Richert, et al.
English translation of the Notification of Reasons for Refusal drafted on Aug. 27, 2015 in corresponding Japanese Patent Application No. 2013-530702, 6 pp.

* cited by examiner

UV hologram at ambient (left) and UV light of LED (right)

Daylight Illumination        UV-Light Illumination

Fig. 2
Side view drawings of two possible layer and micro-structure setups for security features according to this invention
Fig. 2a
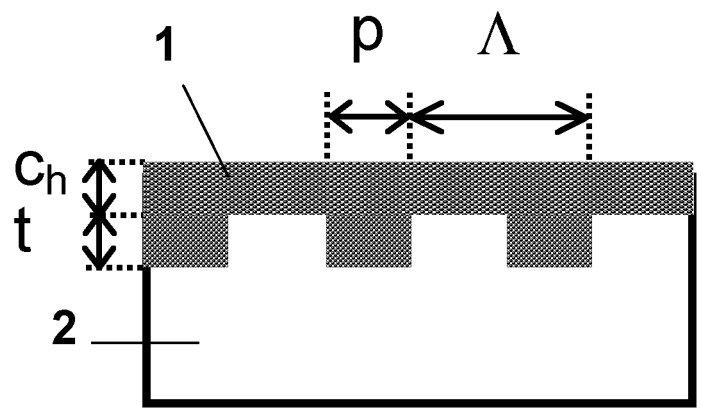
Fig. 2b
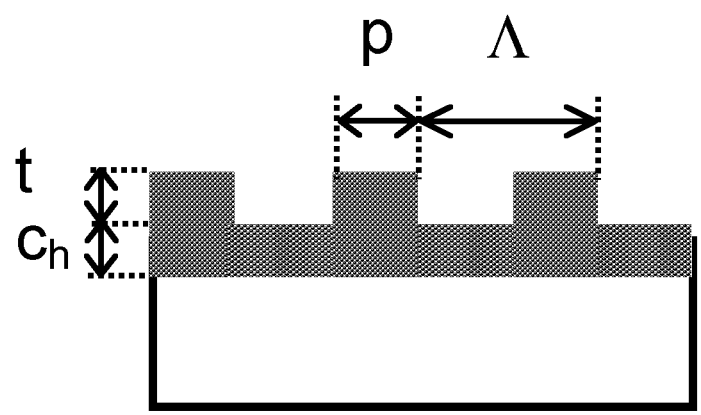
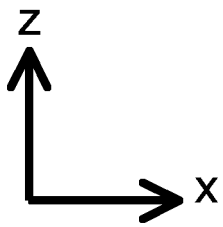

Plot of the measured emission intensity versus wavelength at a viewing angle of 60° for one example of this invention Contrast change of UV hologram at turning around normal

SECURITY ELEMENT

The present invention is in the field of security documents, more particularly in the field of security elements aimed to protect security documents against copying (illegal reproduction) and counterfeiting. It discloses a security element having a security feature which changes its visual appearance after irradiation with light, especially with UV light and at rotation and/or tilting. Security documents comprising said security element, as well as a method for producing said security element, are also disclosed.

EP1998193A1 describes a sensor adapted to be either one of fluorescing or phosphorescing, said sensor comprising:
a zero-order diffractive filter for polarised or unpolarised polychromatic light, said zero-order diffractive filter comprising:
a medium having a low index of refraction $n_{low}$; and
a waveguiding layer having a high index of refraction $n_{high}$;
the medium and the waveguiding layer being arranged such to form grating lines, the grating lines having a period length that is smaller than the wavelength of light for which the filter is designed, characterized in that said sensor comprises an interface between the low refraction index medium and the waveguiding layer, the interface constituting nanostructures; and at least some of said nanostructures being implemented by either one of a fluorescing and phosphorescing material.

In the sensor of EP1998193A1 the interface constituting nanostructures contains the fluorescing and phosphorescing material. This sensor reflects visible light in the zeroth order and shows a colour. This colour changes when the fluorescing or phosphorescing material reacts with the environment. To avoid damping of the light guided in the waveguiding layer the fluorescing or phosphorescing material is not included in the waveguiding layer.

The method for manufacturing the sensor comprising the steps:
providing grating lines made of a medium forming a first substrate;
depositing a plurality of nanostructures onto the first interface, at least some of said nanostructures being implemented by either one of a fluorescing and phosphorescing material; and
depositing at least one waveguiding layer onto the grating lines and nanostructures, the waveguiding layer having a higher index of refraction than the medium.

WO2006018232A1 relates to a security element with an optically variable structure, comprising an embossed structure and a coating, whereby the embossed structure and the coating are combined such that at least part of the coating is fully visible when viewed perpendicularly but hidden on angled viewing. The embossed structure comprises non-linear embossed elements which are combined with the coating such that, on changing viewing angle, different information is visible. The coating may comprise luminescent materials.

The coating is arranged on the embossed elements of the embossed structure.

JP2003248414A relates to a wavelength hologram type forgery preventive seal having an input means for converting the external light made incident from the top surface of a plane type optical waveguide into waveguide light and output means formed with a hologram to generate diffracted light when the waveguide light is made incident thereon, is fixed with a transparent cover seal having an adhesive part to the surface of an object. In contrast in our invention the incoupling and outcoupling are not separated from each other. Both processes take place all over the grated area.

EP1776242A1 relates to a security device composing a zero-order diffractive microstructure buried within a substrate and a further structure comprising one or more optical structures formed on a surface of the substrate to be viewed by a user that modifies the optical characteristics produced by the zero-order microstructure. One or more further optical structures, such as microlenses 1 or sawtooth (20, FIG. 2), may be formed on a surface 2 of the substrate (3). The further optical structures modify the optical characteristics of the zero order diffractive microstructures 5. A material with a colour filter function may be added between the surface of the device 34 and the microstructures 33. Chromophores 31 may be added to the polymer 32. The device may be combined with a hologram.

The chromphores (materials with colour filter function, including fluorophors, phosphorescent dyes, nano-partcle like Q-Dots or metallic nano-partcles) are added between the surface of the device and the microstructures for modifying the colour effect of zero-order microstructure. The colour filter modifies the spectra of the incident light as well as of the reflected light at the microstructures.

EP0420261A2 (EP1241022) relates to a system consisting of a series of data carriers, particularly identity cards, value papers or the like, in which the data carriers belonging to the system exhibit defraction structures which contain a standard information in which parts of the series are changed by additional measures in the area of the defraction structures, or combined with other elements and are visually recognisably distinguished from the rest of the series, the change in defraction structures and/or the combination with other elements conveying an overall aesthetic impression and the change and/or combination with the other elements not being cancellable without destruction of the defraction structures.

The great number of possible variations include the use of different printing techniques, dyes, inks and metalized layers to produce certain optical impressions and realize special forms of individualization. The use of luminescent or phosphorescent substances may make special individualizing measures recognizable only in special illumination.

According to JP2002072835 an information recording part 6 laminated on a base material 2 is formed in the laminate structure comprising a peeling layer 61, a light-refracting structure layer 62, the light-reflective layer 63, a fluorescent layer 64, and an adhesive layer 65 from the top.

In the hologram of JP2001265198, having at least a hologram forming layer 2 and a reflection thin film layer 3 on a support layer 1, at least one layer or interlayer region in the hologram structural layers including these layers contains an organic fluorescent dye, which is excited by IR rays and emits light in the IR region.

The hologram of JP2001255808 provided with at least a hologram forming layer 2 and reflection thin-film layer 3 on a supporting layer 1 is characterized in that the fluorescent dyestuffs excited by UV rays to emit light in an IR region is contained in at least one layer among hologram constituting layers including the respective layers described above or between the layers.

According to JP10129107 an image 3, such as a face photo or the like, is formed on a substrate 2, on which a first information pattern unit 14, containing fluorescence agent emitting infrared rays, is formed, while second information pattern units 15 are formed between either one of an image receiving layer 4 or a hologram layer 8 and a separable protective layer 5 to constitute an image indicating body. The information pattern units, provided in the image indicating body, become luminous by the irradiation of infrared rays and ultraviolet rays, having specified wave lengths, whereby the information patterns can be confirmed visually.

EP 2130884A1 discloses tamper resistant security labels or adhesive tapes comprising a flexible carrier substrate based on flexible plastic foil, where on the carrier substrate following labels are applied: (a) partially a release lacquer in the form of alphabetic characters, signs, symbols, lines, guilloche patterns, numbers or writings; (b) a full-faced or partial coating made from luminescent colors; (c) optionally one or more other layers having optical characteristics or metallic layers; (d) a self-adhesive coating or heat-seal lacquer coating.

The carrier substrate exhibits an optically active structure, like diffractive structures, holograms or waves. The partial luminescent coating is present in the form of alphabetic characters, signs, symbols, lines, guilloche patterns, numbers or writings.

The present invention aims to create a (printable) security feature combining UV hologram with fluorescence in a single system. Security feature should not be observable in ambient light but visible under excitation of, for example, 365 nm UV light. Logo should switch contrast if tilted in the plane of the security feature and/or rotated about the surface normal.

Said object has been solved by a security element comprising:
a medium, or substrate having a low index of refraction $n_{low}$;
a waveguiding layer having a high index of refraction $n_{high}$; which comprises a luminescent material; and
a diffractive microstructure on the surface of the waveguiding layer, or at the interface between the medium, or substrate and the waveguiding layer, or at a distance smaller than 500 nm, especially 200 nm, very especially 50 nm from the waveguiding layer, wherein the refractive index difference between the medium, or substrate having a low index of refraction $n_{low}$ and the waveguiding layer is at least 0.005, especially at least 0.01, very especially at least 0.1;
the microstructure period ($\Lambda$) is in the range of from 100 to 1500 nm, especially 100 to 1000 nm, very especially 100 to 500 nm;
the mass thickness (d) of the waveguiding layer is in the range of from 30 to 1000 nm, especially 50 to 400 nm, very especially 60 to 200 nm; and
the microstructure depth (t) is in the range of from 50 to 1000 nm, especially 80 to 600 nm, very especially 100 to 300 nm.

$n_{low}$ and $n_{high}$ represent the refractive index at the peak of the absorption of the luminescent material. The refractive index difference between the medium, or substrate having a low index of refraction $n_{low}$ and the waveguiding layer is at least 0.005, especially at least 0.01, very especially at least 0.1.

FIG. 1a shows a schematic top view of a security feature according to this invention. In the left part of this figure the security feature is illustrated as illuminated under day light conditions, e.g. sun light or neon lamp illumination. In the right part the appearance under UV light illumination is shown. The logo is only visible under UV light illumination (in this case by UV light of LED with a peak at 365 nm).

Figure 1B:
Figure 1B:
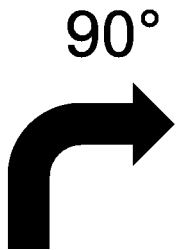
Figure 1B:
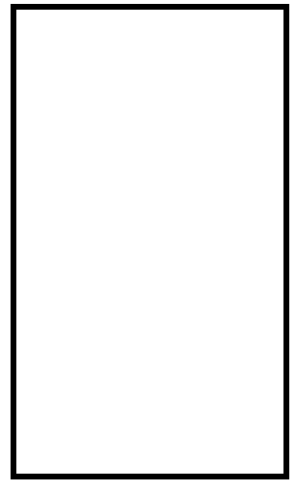

FIG. 1b shows schematically a contrast change of the security element at turning around normal. The UV hologram shows a contrast change at rotation on 90° around a normal to surface. Left image has green fluorescent abbreviation "BASF" surrounded by darker fluorescent background. On turning of UV hologram on 90° the abbreviation "BASF" gets darker and disappears.

FIGS. 2a to 2f depict side view drawings of possible layer and microstructure setups for security features according to this invention. The letter p denotes the width of one bar of the shown diffraction microstructure, $\Lambda$ is the period and t the depth of this diffractive microstructure and $c_h$ is the thickness of the homogeneous part of the waveguiding layer comprising the light emitting—respectively fluorescent or phosphorescent—material. The total mass thickness d of this waveguiding layer is in both cases: $d=c_h+t\times p/\Lambda$. $c_{sep}$ is the thickness of the separation layer.

Figure 3:
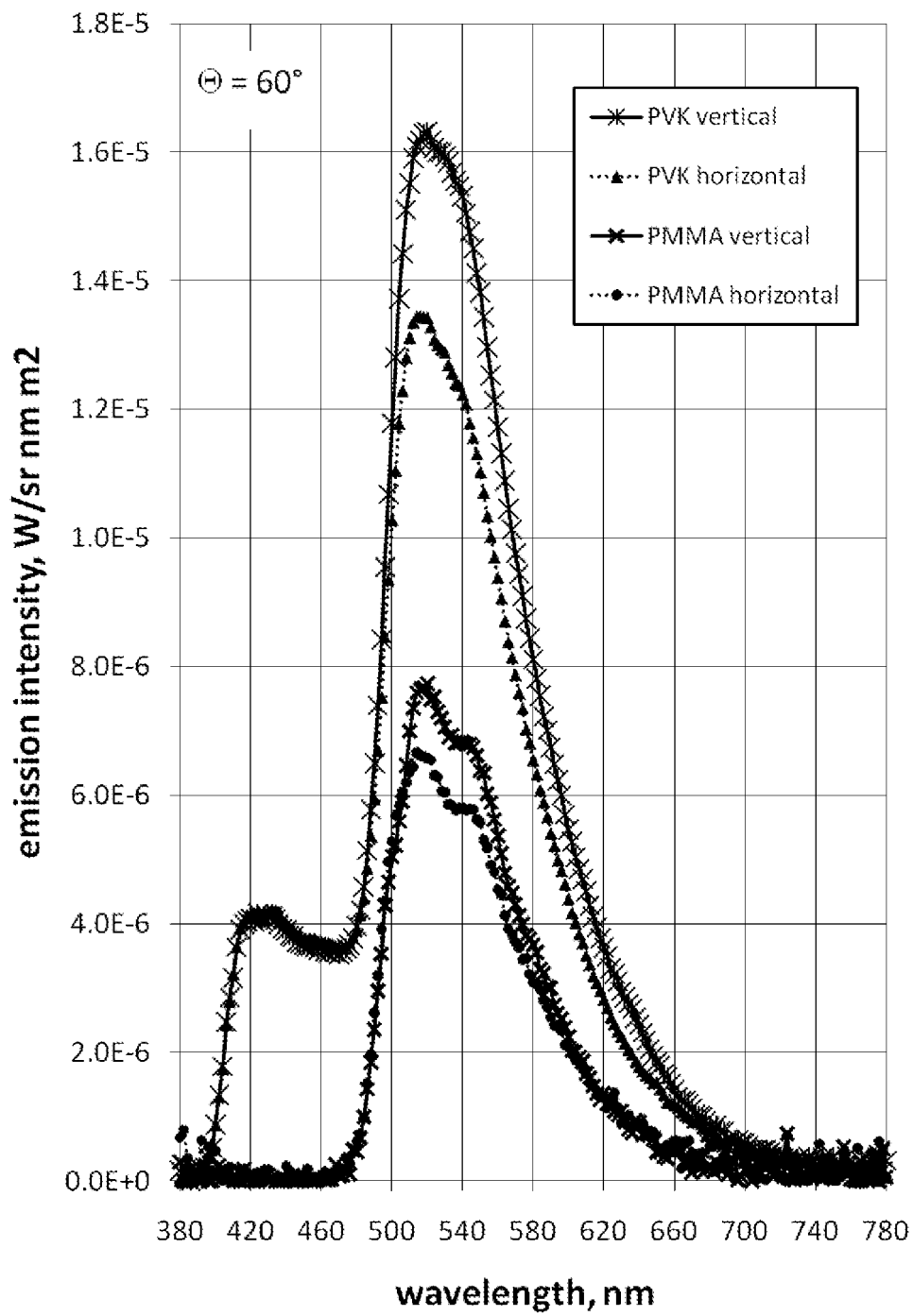

FIG. 3 is a plot of the measured emission intensity versus wavelength at a viewing angle of 60° for Example 1 of this invention. The emission intensity was measured for one emitting material embedded in two different matrix materials of the waveguiding layer, namely PVK and PMMA. Further it was measured for the two different orientations of the used linear diffraction grating, namely viewing direction horizontal or vertical to grating lines.

Figure 4A:
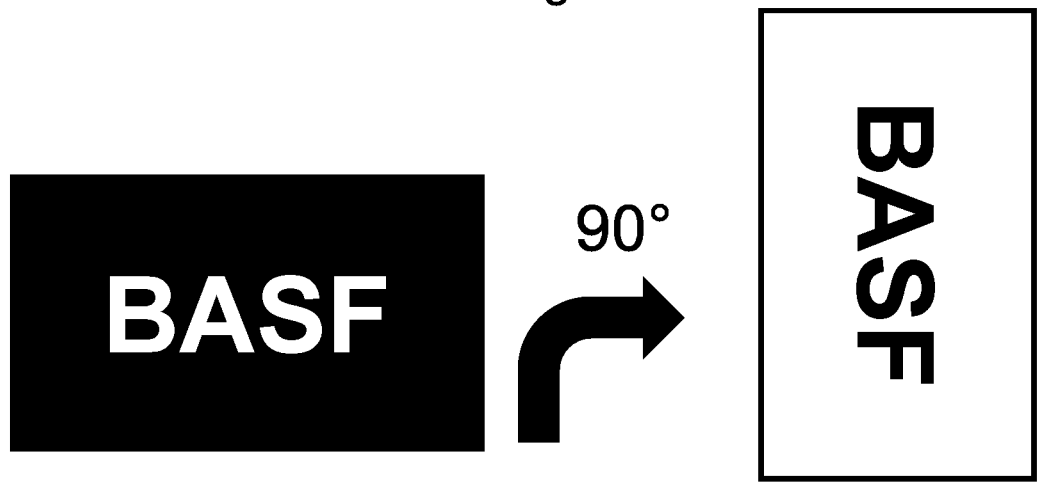

FIG. 4a shows schematically a contrast change of the security element at turning around normal. The UV hologram shows a contrast change at rotation on 90° around a normal to surface. Left image has green fluorescent abbreviation "BASF" surrounded by darker background. Turn of UV hologram on 90° changes color arrangement (dark abbreviation "BASF" is surrounded by green fluorescent background). Better visibility of contrast change can be obtained at positioning of grating grooves on 45° to light source and "left-right" tilting.

Figure 4B:
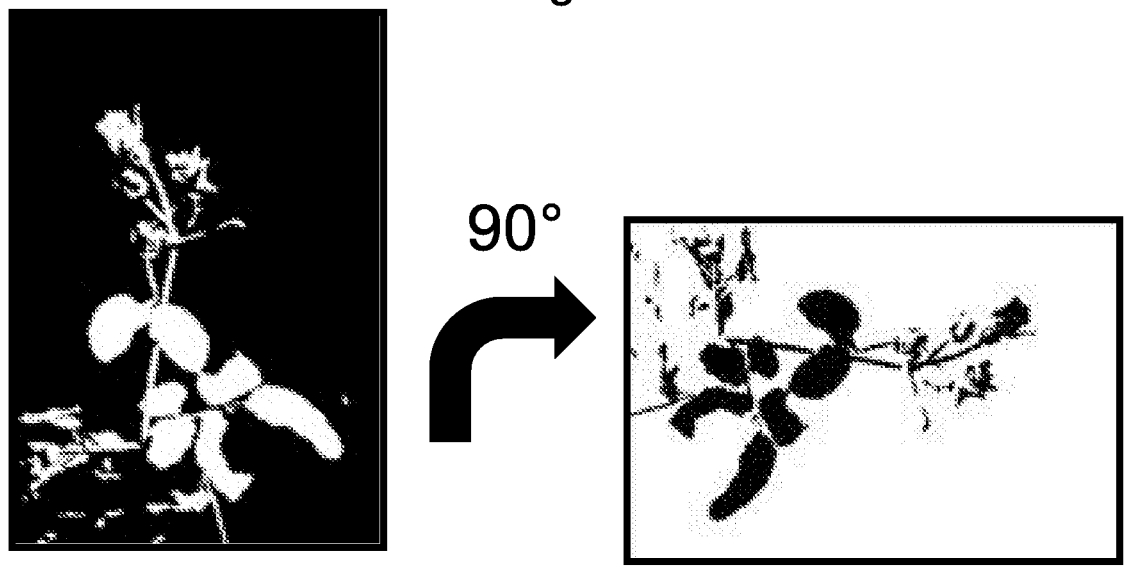

FIG. 4b shows a similar security element but with a fluorescent image showing a rose instead of the BASF letters. The fluorescent image changes from positive to negative image upon rotation.

What's needed to make a logo invisible in day light but visible at illumination by UV lamp is a grating coated by a waveguiding layer, comprising a luminescent or light emitting material. Alternatively the waveguiding layer is deposited first and microstructured with the grating afterwards. The waveguiding layer having a high refractive index and a resonance filter property of high reflection at appointed wavelength, groove orientation and illumination angle. High reflection at excitation wavelength provides an emission of luminescent material. FIG. 1 shows schematically the invisible in day light but visible in UV light effect and FIG. 2 shows schematically side views of the layer and structure setup.

The security device according to the present invention can be used in the manufacturing of banknotes, credit cards, passports, tickets and for brand protection purposes.

Accordingly, the present invention is also directed to a product, such as, for example, a banknote, a credit card, a passport, or a ticket, comprising the security device according to the present invention.

The term "diffractive microstructure on the surface of the waveguiding layer" means that the diffractive microstructure is embossed in the waveguiding layer.

The term "diffractive microstructure at the interface between the medium, or substrate and the waveguiding layer" means that the diffractive microstructure is either embossed in the medium, or substrate; or the waveguiding layer. That means, the diffractive microstructure is part of the medium, or substrate; or the waveguiding layer.

The term "diffractive microstructure in at least one interface between the medium or substrate and the waveguiding layer" means that the diffractive microstructure is part of a separate layer, wherein the distance of the diffractive microstructure to the waveguiding layer—respectively the thickness $c_{sep}$ of the separation layer—is smaller than 500 nm, especially 200 nm, very especially 50 nm.

The term 'waveguiding' layer is known in the field. To fulfill its function according to this invention, a waveguiding layer has at least one diffractive microstructure in one of its surface or one of its interface. Further the refractive index in spectral range of peak absorption of the light emitting material is typically at least 0.005 higher when compared with the adjacent layers. Many fluorescent or phosphorescent materials have an absorption peak in the UV spectral range. Advantageously the waveguiding layer is substantially transparent at least in part of the visible light. Preferred it has sharp interfaces to the adjacent layer(s) or media.

Substantially transparent are layers with a transmission T>50%, preferably T>90%; at least in a part of the visible spectral range. A sharp interface according to this invention is less than 200 nm thick, preferred less than 80 nm thick, particularly preferred less than 30 nm thick. The interface is the zone between two layers where the refractive index changes from the value of one layer to the value of the other layer. Preferably, the waveguiding layer has one diffractive microstructure in one of its surfaces.

The term 'diffractive microstructure' is known in the field. Such microstructures are characterized by the period $\Lambda$, the structure depth t, the grating trough, or bar width p, the fill factor (or duty cycle) f.f.=p/$\Lambda$, and the shape of the microstructure (e.g. rectangular, sinusoidal, triangular or more complex, preferably rectangular). In a security element according to the invention the period is typically between 150 nm and 1500 nm, preferably between 200 nm and 1000 nm and particularly preferably between 200 nm and 500 nm. Preferably the microstructures are linear, or crossed gratings.

The term 'grating lines' is known in the field. The shape of the grating lines defines the microstructure. Typically, linear lines are used.

The total mass thickness d of the waveguiding layer is preferably in the range of 30 nm to 1000 nm, especially preferred between 80 nm and 200 nm. The waveguiding layer as described herein may comprise additional components, such as fillers, wetting agents and the like. Such additives are known in the field and are commercially available.

Suitable parameters for the microstructured waveguiding layer according to this invention are summarized below:

| Parameter | Suitable range | Preferred range | Especially preferred range |
| --- | --- | --- | --- |
| Period $\Lambda$ | 150-1500 nm | 200-1000 nm | 200-500 nm |
| Mass thickness d | 30-1000 nm | 50-400 nm | 80-200 nm |
| depth t | 50-1000 nm | 80-600 nm | 100-300 nm |
| Fill factor f.f. | 0.2-0.8 | 0.3-0.7 | 0.4-0.6 |
| Thickness of Interface | <200 nm | <80 nm | <30 nm |
| Thickness of separation layer $c_{sep}$ | <500 nm | <200 nm | <50 nm |

If not otherwise mentioned all values for the 'refractive index' are determined for a wavelength of 365 nm. Unless otherwise stated, a high refractive index of a layer refers to the fact that the adjacent layers have a lower refractive index; and vice versa. Further, it is understood that, in line with physical principles, the minimum refractive index is 1.0. Thus, reference to a refractive index of e.g. "lower than 1.5" always implies "lower than 1.5 but at least 1.0".

The diffractive microstructure is preferably a diffraction grating having a microstructure period (A) in the range of 270±30 nm; the thickness (d) of the waveguiding layer is in the range of 140±50 nm; and the microstructure depth (t) in the range of 140±30 nm.

The diffractive microstructure consists of at least two part-areas adjacent or nearby to one another, wherein one part-area comprises one grooves orientation and the other part-area comprises another different grooves orientation and/or one part-area comprises one grating period and the other part-area comprises another different grating period.

In a particularly preferred embodiment both part-areas comprise a logo in the diffractive microstructure, upon irradiation of the luminescent material the first logo appears bright and the second logo appears dark depending on the orientation of the grooves and upon rotation the first logo appears dark and the second logo appears bright.

The part-areas have preferably a defined shape, such as, for example, a symbol, a stripe, a geometrical shape, a design, lettering, an alphanumeric character, the representation of an object or parts thereof. Reference is made to FIG. 4.

In preferred embodiment the security device comprises
a) a layer of a medium having a low index of refraction $n_{low}$;
b) a diffractive microstructure on the medium having a low index of refraction $n_{low}$;
c) a waveguiding layer having a high index of refraction $n_{high}$, which comprises a luminescent material, on the diffractive microstructure; and optionally
d) a layer of a medium having a low index of refraction $n_{low}$.

In another preferred embodiment the security device comprises
A) a layer of a medium having a low index of refraction $n_{low}$;
B) a waveguiding layer having a high index of refraction $n_{high}$; which comprises a luminescent material, on the medium having a low index of refraction $n_{low}$;
C) a diffractive microstructure on the waveguiding layer having a high index of refraction $n_{high}$; and optionally
D) a layer of a medium having a low index of refraction $n_{low}$.

Reference is made to FIG. 2a to FIG. 2f. FIGS. 2a to 2f depict side view drawings of possible layer and microstructure setups for security features according to this invention. The letter p denotes the width of one bar of the shown diffraction microstructure, $\Lambda$ is the period and t the depth of this diffractive microstructure and $c_h$ is the thickness of the homogeneous part of the waveguiding layer comprising the light emitting—respectively fluorescent or phosphorescent—material. The total mass thickness d of this waveguiding layer is in both cases: $d=c_h+t\times p/\Lambda$. $c_{sep}$ is the thickness of the separation layer.

The security devices shown in FIGS. 2a and 2b consist of a medium, or substrate having a low index of refraction $n_{low}$ (2) and a waveguiding layer (1).

In the security device shown in FIG. 2a the diffractive microstructure is at the interface between the medium, or substrate having a low index of refraction $n_{low}$ (2) and the waveguiding layer (1). In the security device shown in FIG. 2b the diffractive microstructure is on the surface of the waveguiding layer (1).

Figure 2C:
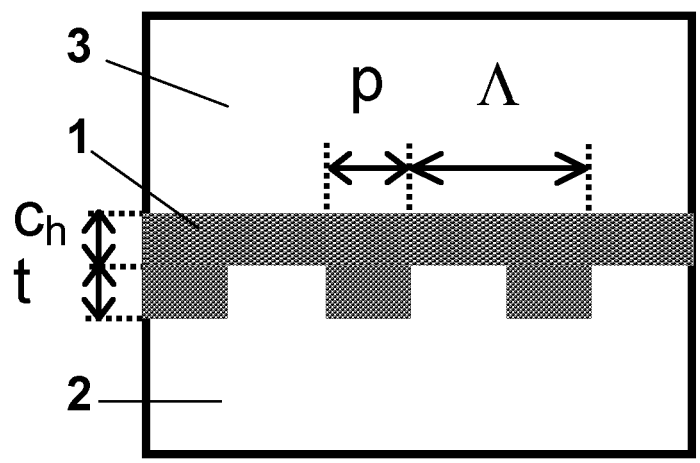
Figure 2D:
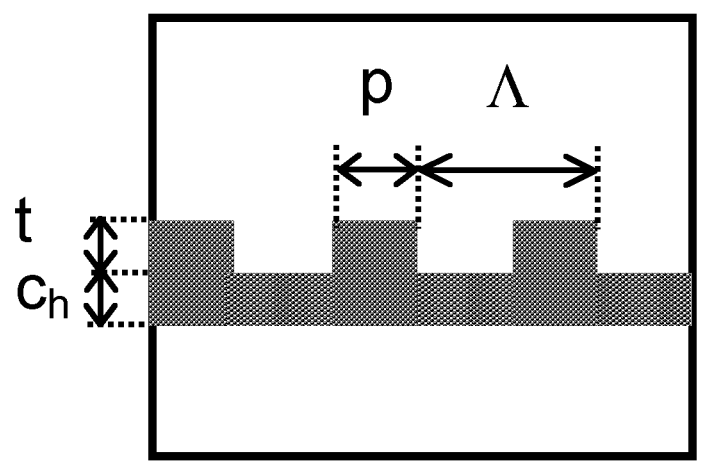
Figure 2D:
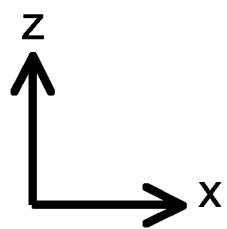

The security devices shown in FIGS. 2c and 2d consist of a medium, or substrate having a low index of refraction $n_{low}$ (2), a waveguiding layer (1) and a second medium having a low index of refraction $n_{low}$ (3).

In the security device shown in FIG. 2c the diffractive microstructure is at the interface between the medium, or substrate having a low index of refraction $n_{low}$ (2) and the waveguiding layer (1). In the security device shown in FIG. 2b the diffractive microstructure is on the surface of the waveguiding layer (1).

Figure 2E:
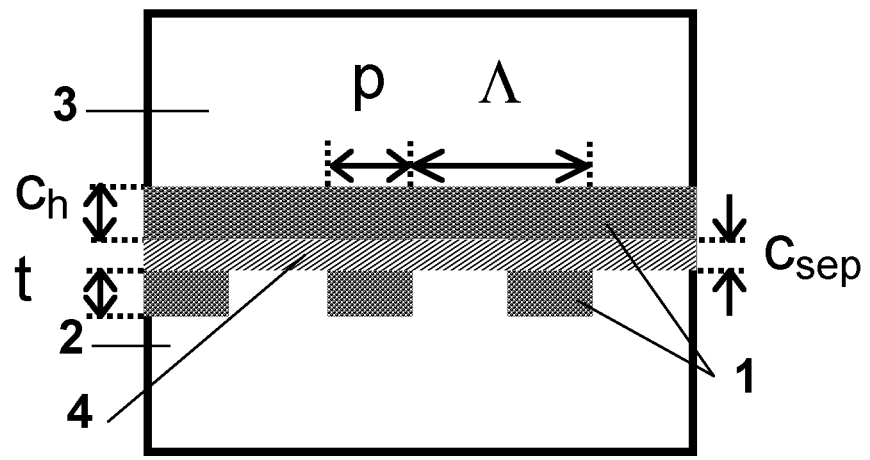
Figure 2F:
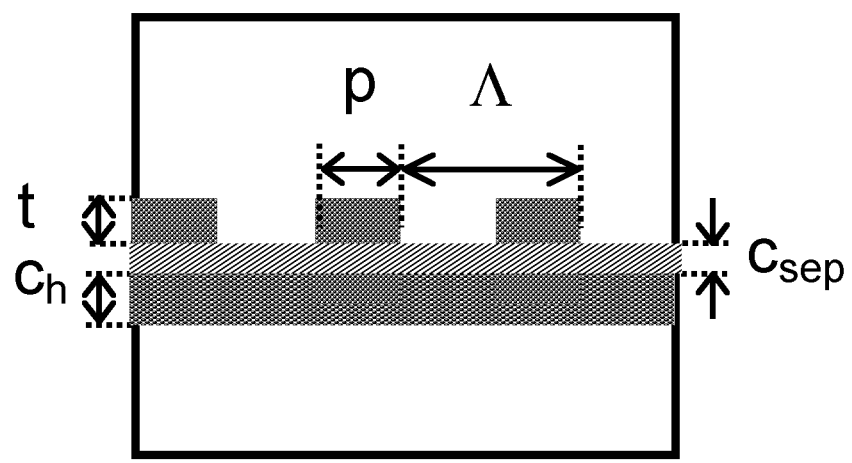
Figure 2F:
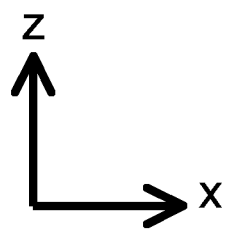

The security devices shown in FIGS. 2e and 2f consist of a medium, or substrate having a low index of refraction $n_{low}$ (2), a separation layer (4), a waveguiding layer (1), and a second medium having a low index of refraction $n_{low}$ (3).

In the security device shown in FIG. 2e the diffractive microstructure is at the interface between the medium, or substrate having a low index of refraction $n_{low}$ (2) and the waveguiding layer (1). In the security device shown in FIG. 2f the diffractive microstructure is at the interface between the medium (3) having a low index of refraction $n_{low}$ (2) and the waveguiding layer (1).

The luminescent material can solely constitute the waveguiding layer. Preferably, the waveguiding layer having a high index of refraction $n_{high}$ comprises a matrix material and the luminescent material (light emitting material).

Typically, the luminescent material is used in an amount of 0.1 to 40% by weight, especially 0.1 to 20% by weight, based on the amount of luminescent material and a matrix material.

The waveguiding layer comprises a luminescent material. The luminescent material can solely constitute the waveguiding layer or represents one component of the waveguiding layer. Accordingly, the waveguiding layer may be made from a matrix plus light emitting material blend. Examples for the matrix material are polymers such as polymethylmethacrylate, or polyvinylcarbazole. In principle, the matrix material can be any material provided it has in combination with the luminescent a higher index of refraction than the medium having a low index of refraction $n_{low}$. Examples of the matrix material include the materials mentioned below for the medium having a low index of refraction $n_{low}$. Alternatively the matrix can be UV primer (UV curable composition), or a water soluble, thermoplastic polymer. Examples of suitable water soluble polymers are selected from the group consisting of unmodified natural polymers, modified natural polymers, and synthetic polymers, including partly or completely hydrolyzed polyvinyl alcohol PVA and co-polymers with vinyl acetate and other monomers; modified polyvinyl alcohols; homo- or co-polymers of (meth)acrylamide; polyethylene oxide PEO; polyvinyl pyrrolidone PVP; polyvinylacetate; stark; cellulose and its derivatives, like hydroxyethylcellulose or carboxymethylcellulose; gelatine; polyurethane PU.

The at present most preferred matrix materials are selected from polyvinylcarbazole, polymethylmethacrylate, UV primer (UV curable composition), vinyl chloride and vinyl acetate copolymers and nitrocellulose.

In a further embodiment of this invention, the waveguiding layer comprises—besides the matrix and the light emitting material—nanoparticles with a refractive index that is higher than the one of the matrix material. Examples are $TiO_2$ and $ZrO_2$ nanoparticles. Preferably, the size of the nanoparticles is in the range of 5 nm to 200 nm, particularly preferred between 10 nm and 60 nm. Furthermore, the particle size distribution should preferably be low.

In principle, the luminescent material can be any material which emits light in the visible, range after irradiation. The luminescent or light emitting material can be a fluorescent material, a phosphorescent material, or other like materials. Such luminescent materials exhibit a characteristic emission of electromagnetic energy in response to an energy source generally without any substantial rise in temperature.

In a preferred embodiment of the present invention the luminescent material is irradiated at 365 nm (invisible irradiation) and shows visible emission. In said embodiment the luminescent material is a material which has an absorption maximum close to 365 nm (365±40 nm).

The luminescent material may be selected from metal complexes, fluorescent organic dyes, fluorescent polymers, and inorganic phosphors.

Metal complexes may be used as luminescent material. Examples of phosphorescent and related materials are described, for example, in WO00/57676, WO00/70655, WO01/41512, WO02/15645, US2003/0017361, WO01/93642, WO01/39234, U.S. Pat. No. 6,458,475, WO02/071813, U.S. Pat. No. 6,573,651, US2002/0197511, WO02/074015, U.S. Pat. No. 6,451,455, US2003/0072964, US2003/0068528, U.S. Pat. Nos. 6,413,656, 6,515,298, 6,451,415, 6,097,147, US2003/0124381, US2003/0059646, US2003/0054198, EP1239526, EP1238981, EP1244155, US2002/0100906, US2003/0068526, US2003/0068535, JP2003073387, JP2003073388, US2003/0141809, US2003/0040627, JP2003059667, JP2003073665 and US2002/0121638.

The emission wavelengths of cyclometallated Ir(III) complexes of the type $IrL_3$ and $IrL_2L'$, such as the green-emitting fac-tris(2-phenylpyridinato-N,$C^{2'}$)indium(III) and bis(2-phenylpyridinato-N,$C^{2'}$)Iridium(III) (acetylacetonate) may be shifted by substitution of electron donating or withdrawing groups at appropriate positions on the cyclometallating ligand L, or by choice of different heterocycles for the cyclometallating ligand L. The emission wavelengths may also be shifted by choice of the ancillary ligand L'. Examples of red emitters are the bis(2-(2'-benzothienyl)pyridinato-N,$C^{3'}$)iridium(EI)(acetylacetonate), iridium(III)bis(2methyldibenzo[f,h]quinoxaline) (acetylacetonate), and tris(1-phenylisoquinolinato-N,C)iridium(III). A blue-emitting example is bis(2-(4,6-difluorophenyl)-pyridinato-N,$C^{2'}$)Iridium(III) (picolinate).

Red phosphorescence has been reported, using bis(2-(2'-benzo[4,5-a]thienyl)pyridinato-N, $C^3$)iridium(acetylacetonate)[$Btp_2Ir(acac)$] as the phosphorescent material (Adachi, C., Lamansky, S., Baldo, M. A., Kwong, R. C., Thompson, M. E., and Forrest, S. R., App. Phys. Lett., 78, 1622 1624 (2001). Green phosphorescence has been reported for

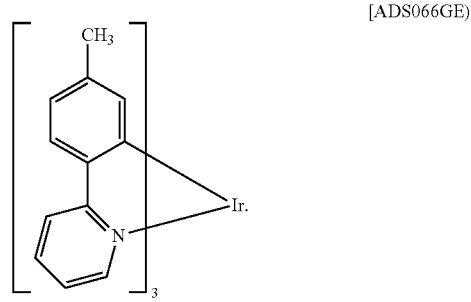

[ADS066GE]

Other phosphorescent materials include cyclometallated Pt(II) complexes such as cis-bis(2-phenylpyridinato-N,$C^{2'}$) platinum(II), cis-bis(2-(2'-thienyl)pyridinato-N,$C^{3'}$) platinum(II), cis-bis(2-(2'-thienyl)quinolinato-N,$C^{5'}$) platinum(II), or (2-(4,6-difluorophenyl)pyridinato-NC2') platinum(II) acetylacetonate. Pt(II)porphyrin complexes such as 2,3,7,8,12,13,17,18-octaethyl-21H, 23H-porphine platinum(H) are also useful phosphorescent materials.

Other phosphorescent materials are described in WO06/000544 and WO08/101,842, WO2005/019373, WO2006/056418, WO2005/113704, WO2007/115970, WO2007/115981 and WO2008/000727.

Still other examples of useful phosphorescent materials include coordination complexes of the trivalent lanthanides such as $Th^{3+}$ and $Eu^{3+}$ (J. Kido et al, Appl. Phys. Lett., 65, 2124 (1994) and J. Kido et al, Chem. Rev. 102 (2002) 2357-2368), such as, for example,

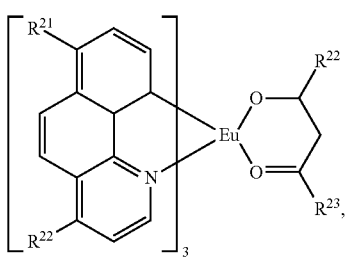

wherein $R^{21}$ and $R^{22}$ are independently of each other H, phenyl, $C_1$-$C_{18}$alkyl, which may be interrupted by one, or more oxygen atoms, and $R^{22}$ and $R^{23}$ are independently of each other $C_1$-$C_{18}$alkyl, phenyl, which may be substituted by one, or more $C_1$-$C_{18}$alkyl groups, which may be interrupted by one, or more oxygen atoms; or biphenyl, which may be substituted by one, or more $C_1$-$C_{18}$alkyl groups, which may be interrupted by one, or more oxygen atoms.

Yellow fluorescence has been reported for

[ADS045YE]

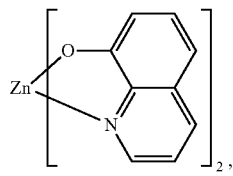

Suitable inorganic phosphors having an average particle size below 100 nm are, for example described in WO2009/077350 (especially Examples 1 to 3).

Suitable fluorescent colorants are based on known colorants selected from coumarins, benzoxazinones, benzocoumarins, xanthenes, benzo[a]xanthenes, benzo[b]xanthenes, benzo[c]xanthenes, phenoxazines, benzo[a]phenoxazines, benzo[b]phenoxazines and benzo[c]phenoxazines, napthalimides, naphtholactams, azlactones, methines, oxazines and thiazines, diketopyrrolopyrroles, perylenes, quinacridones, benzoxanthenes, thioepindolines, lactamimides, diphenylmaleimides, acetoacetamides, imidazothiazines, benzanthrones, perylenmonoimides, perylenes, phthalimides, benzotriazoles, pyrimidines, pyrazines, triazoles, dibenzofurans and triazines.

Preferably, the luminescent material is selected from metal complexes, such as, for example,

[ADS066GE]

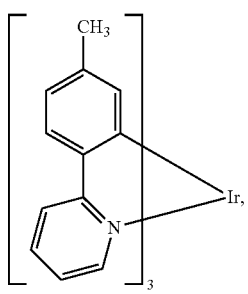

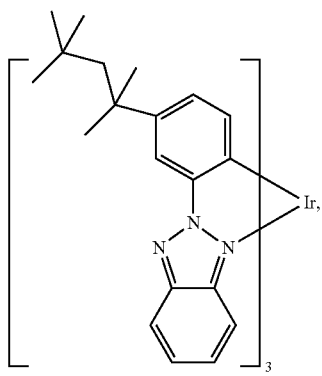

[ADS045YE]

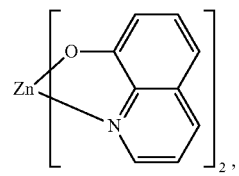

(Cpd. A-1)

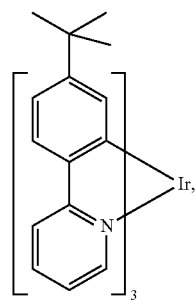

fluorescent organic dyes, such as, for example,

[Coumarin 480]

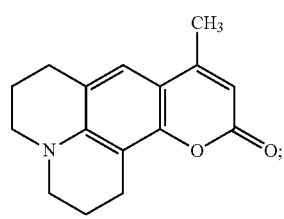

or fluorescent polymers, such as, for example,

[ADS233YE]

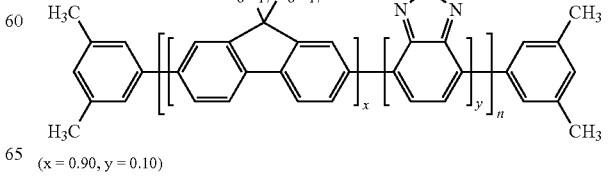

(x = 0.90, y = 0.10)

and substituted phthalimidine dyes, such as, for example

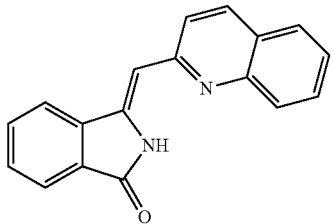

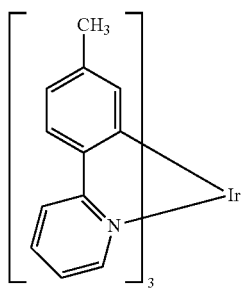

has a higher emission intensity in combination with polyvinylcarbazole (PVK) than with polymethylmethacrylate (PMMA; n=1.8006 for 9% by weight

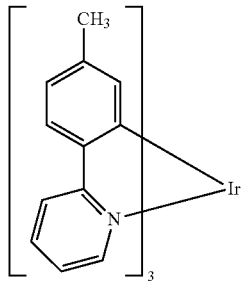

and 91% by weight polyvinylcarbazol and n=1.5201 for 9%

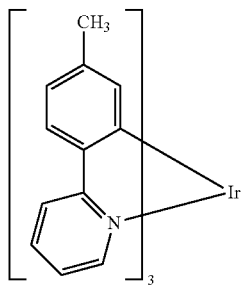

and 91% by weight polymethylmethacrylate at 365 nm). FIG. 3 shows the corresponding fluorescence emission intensity versus wavelength spectra at an observation angle of 60° and for viewing direction vertical or horizontal to the grating lines.

A fluorescent material with higher refractive index has better waveguiding property which leads to a higher emission intensity.

In case of

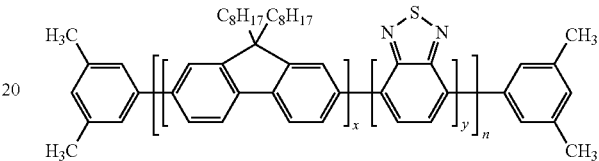

the situation is opposite. Emission is higher for a waveguiding layer with lower refractive index (n=1.7546 for 9% by weight

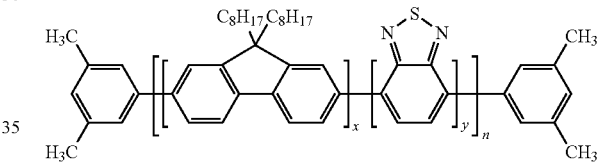

and 91% by weight polyvinylcarbazole and n=1.5172 for 9%

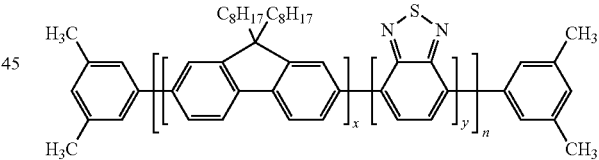

and 91% by weight polymethylmethacrylate at 365 nm).

Without being bound to theory it is believed that in this case another effect dominates over the better waveguiding effect namely the quenching of the emitter due to interactions with the matrix material. Quenching of fluorophors and phosphorescent material is a complex process and such materials interact different with different matrix polymers. On one hand the matrix can directly quench the emitter. Alternatively the interaction between both during the film formation can lead to a demixing and thus an agglomeration of the emitter. In the latter case self-quenching of the emitter can take place. Reference is made to table 1.

TABLE 1

Refractive Index (n) and Extinction Coefficient (k) of luminescent materials at 365 nm (ellipsometric measurements on a borofloat substrate at layer thickness 200-300 nm)

| Material | Absorption maximum, nm | Emission maximum, nm | n | k |
| --- | --- | --- | --- | --- |
| 9% of ADS066GE + 91% of PVK | 374 | 505 | 1.8006 | 0.0280 |
| 9% of ADS066GE + 91% of PMMA | 374 | 505 | 1.5201 | 0.0058 |
| 9% of ADS233YE + 91% of PVK | 386 | 538 | 1.7546 | 0.0975 |
| 9% of ADS233YE + 91% of PMMA | 386 | 538 | 1.5172 | −0.0008 |
| 9% of ADS045YE + 91% of PVK | 381 | 536 | 1.8246 | 0.0320 |
| 9% of ADS045YE + 91% of PMMA | 381 | 536 | 1.5138 | 0.0100 |
| 9% of Coumarin 480 + 91% of PVK | 390 | 452 | 1.8154 | 0.0753 |
| 9% of Counarin 480 + 91% of PMMA | 390 | 452 | 1.4945 | 0.0103 |
| 9% of Cpd. A-1 + 91% of PVK | — | 519 | 1.8829 | 0.1179 |
| PMMA | — | — | 1.4975 | 0.0202 |
| PVK | — | — | 1.5782 | 0.0020 |

Emission intensity can be increased with amount of emitter in waveguiding layer and/or excitation power.

The diffractive microstructure is typically provided in a low index substrate before depositing the waveguiding layer. Alternatively it is applied to the waveguiding layer, for example by embossing.

The layer of a medium having a low index of refraction $n_{low}$ can represent the substrate layer. The layer of a medium having a low index of refraction $n_{low}$ may be made from PET, PC, PMMA, or acrylates. The medium having a low index of refraction $n_{low}$ is preferably selected from polymethylmethacrylate, polycarbonate, polyethylenetherephatalate coated with an embossing layer, especially an embossable acrylate In another embodiment the layer of a medium having a low index of refraction $n_{low}$ may be made of an UV-curable polymer, such as Ormocomp® made by Micro Resist Technology, or the UV curable compositions described in WO2008/061930 (page 8 to 35).

Alternatively, the layer of a medium having a low index of refraction $n_{low}$ can be a porous layer. Such porous layers are known in the art. They advantageously comprise inorganic nanoparticles, preferably in combination with one or more organic binders. Suitable inorganic nanoparticles are preferably selected from the group consisting of oxides like $SiO_2$, $Al_2O_3$ or AlOOH.

The substrate of the security element can be made of any suitable material known to the skilled person. The selection of the substrate depends on the intended use and the manufacturing process. Substrates may e.g. be made of glass, paper, or polymer foils. Advantageously, transparent and flexible polymer foils are used. Such foils can be selected from the group consisting of Cellulose esters (like Cellulosetriacetate, Celluloseacetate, Cellulosepropionate or Celluloseacetate/butyrate), Polyesters (like Polyethylen terephthalate PET or Polyethylen naphthalate PEN), Polyamides, Polycarbonates PC, Polymethylmetacrylates PMMA, Polyimides PI, Polyolefins, Polyvinylacetates, Polyethers, Polyvinylchloride PVC and Polyvinylsulfone PSU. Preferred are Polyesters, particularly Polyethylenterephthalate like Mylar (DuPont) or Polyethylennaphthalate, due to their exceptional stability. Suitable opaque flexible substrates are for example Polyolefin coated paper and white opaque Polyester like Melinex (DuPont).

The refractive index of the substrate at a wavelength of about 300 to 500 nm can e.g. be in the range of 1.35 to 1.80, but typically it is between 1.49 (PMMA) and 1.59 (PC). The thickness of the substrate depends on the intended use, and on the equipment used; it is preferably between 25 μm and 200 μm. In a preferred embodiment, the substrate is "flexible"; this relates to the bending properties, in particular to enable a roll-to-roll process for manufacturing a security element.

Optionally, the adhesion properties of the substrate may be improved by chemical or physical methods. Chemical methods include the deposition of a bonding agent, e.g. deposition of terpolymers of vinylidenchloride, acrylnitril and acrylic acid or of vinylidenchloride, methyllacrylate and itaconic acid. Physical methods include plasma treatment like corona treatment. The substrates described above are commercially available or obtainable according to known methods.

Optionally, the security element according to the invention may comprise one or more covering layers, deposited on top of the waveguiding layer. The covering layer can be made of any suitable material. To keep the waveguiding properties of the waveguiding layer with index of refraction $n_1$, the covering layer must have at least a refractive index $n_4$ at the absorption peak position of the luminescent material $n_4 < n_{low} - 0.005$ and preferred $n_4 < n_{low} - 0.1$. The selection of the material for the covering layer depends on the intended use of the security element and its manufacturing process. Suitable are e.g. the same polymers that can be used for manufacturing the low index substrate. Furthermore, the same porous materials can be used as for the layer of a medium having a low index of refraction $n_{low}$.

Optionally, one or more additional layers are included for accommodating specific uses or needs. Such layers may e.g. be release layers or adhesive layers. Adhesive layers may be deposited as a top layer on the security element, on the side opposite to the substrate. A release layer may be a first layer on top of the substrate. Such layers, their materials and production are known in the field. Preferably, the manufacture of such layers is included in a roll-to-roll process. Depending on the security element manufactured, such additional layers need to be transparent and may require sharp interfaces.

A method for manufacturing security elements according to the invention comprises the subsequent deposition of layers on a substrate. Accordingly, the process for manufacturing the security device, comprises the steps:

providing a medium having a low index of refraction $n_{low}$;
forming a diffractive microstructure in the medium having a low index of refraction $n_{low}$ by embossing;
deposition of a (polymer) layer comprising a luminescent material (waveguiding layer) on the diffractive microstructure; and optionally
deposition of a layer of a medium having a low index of refraction $n_{low}$ on the waveguiding layer; or
providing a medium having a low index of refraction $n_{low}$;
deposition of a (polymer) layer comprising a luminescent material (waveguiding layer) on the medium having a low index of refraction $n_{low}$;
forming a diffractive microstructure on the waveguiding layer by embossing; and optionally
deposition of a layer of a medium having a low index of refraction $n_{low}$ on the waveguiding layer. Preferably all deposition steps are part of a roll-to-roll process.

In a first step a layer of a medium having a low index of refraction $n_{low}$ is deposited on a flexible substrate. The substrate may be transparent or opaque. Optionally, an organic binder or other additives are added to the dispersion. The layer obtained is dried, e.g. by air fans, infrared radiation or microwave radiation. The drying is done preferred in an air flow with a temperature below 60° C. Preferably, the drying is carried out immediately after deposition.

In a next step, a waveguiding layer comprising the luminescent material is deposited on the layer of a medium having a low index of refraction $n_{low}$. After deposition the waveguiding layer is dried if necessary.

In a subsequent step, diffractive microstructures are embossed in the waveguiding layer, with an embossing tool, e.g. a nickel shim. The embossing may be carried out at elevated temperature and/or with UV-illumination ("hot"- and "UV"-embossing). Typically hot-embossing is done at a temperature above the glass transition temperature of the waveguiding layer. Optionally, a hardening of the polymer layer may be applied.

In a further variant, the embossing step is done first. Thus, the diffractive microstructure is embossed, preferably hot-embossed, directly on or in the low index substrate, or in a low index embossable layer deposited on the substrate. Next, the waveguiding layer is deposited on the microstructured substrate. The same considerations regarding the indices of refraction of all layers are applicable as for the method described above. Depending i) on the viscosity of the solution or dispersion, ii) the dried layer thickness, and iii) the depth of the microstructure, the top surface of the waveguiding layer is flat, or has a diffractive microstructure correlated to the microstructure of the substrate. Optionally, on top of the waveguiding layer an additional covering layer may be deposited. One function of this layer is to protect the waveguiding layer against environmental influences and mechanical stress. Optionally, an additional polymer top coat (not shown) may be deposited, as described before. The possible materials for the substrate and the layers are the same as discussed above.

In a further variant the coated and micro-structured foil is used to manufacture adhesive tags or labels bearing the color effect. For this purpose, the uncoated side of the substrate or the top coat of the layer stack is provided with an adhesive layer and a removable carrier protecting the adhesive layer. The latter can be e.g. silicon coated paper, or polymeric foil. The substrate with the coated layer stack is then sliced such that tags or labels of the desired size can be stripped of the carrier and applied to products, packages and the like. The known techniques of labeling tags with additional information like batch number, company logo and the like can be applied to a foil manufactured according to the invention.

In another embodiment of both production methods, one additional release layer is deposited between the substrate and the first coated layer, and one additional adhesive layer (such as a thermo-activateable adhesive layer) is deposited as top layer. This enables a separation of the coated layer stack from the substrate and to transfer the obtained security element to another surface. With this method, it is possible to manufacture a security element that is transferable to the surface of another device such as a package, banknote, security device, e.g. by a lamination process or a hot stamping process. A security element according to this embodiment is distinctly thinner compared to a security element which is glued with an adhesive to a product or a package and the like according to the embodiment described before.

In a particularly preferred embodiment the process for forming the security comprises the steps of;
A) applying a curable composition (UV primer; the medium having a low index of refraction $n_{low}$) to at least a portion of the substrate;
B) forming a diffractive microstructure on at least a portion of the curable composition;
C) curing the composition;
D) depositing a (polymer) layer comprising a luminescent material (waveguiding layer) on the medium having a low index of refraction $n_{low}$.

Advantageously, the present invention involves the transfer of the diffraction gratings directly onto the surface of a substrate with high productivity and low cost.

The forming of diffractive microstructures on the substrate comprises depositing a curable compound, or composition on at least a portion of the substrate. The composition, generally a coating or lacquer may be deposited by means of gravure, flexographic, ink jet and screen process printing. The curable lacquer may be cured by actinic radiations, preferably ultraviolet (U.V.) light or electron beam. Preferably, the lacquer is UV cured. UV curing lacquers can be obtained from BASF SE. The lacquers exposed to actinic radiations or electron beam used in the present invention are required to reach a solidified stage when they separate again from the imaging shim in order to keep the record in their upper layer of the diffraction grating image or pattern. Particularly suitable for the lacquers compositions are chemistries used in the radiation curable industries in industrial coatings and graphic arts. Particularly suitable are compositions containing one or several photo-latent catalysts that will initiate polymerization of the exposed lacquer layer to actinic radiations. Particularly suitable for fast curing and conversion to a solid state are compositions comprising one or several monomers and oligomers sensitive to free-radical polymerization, such as acrylates, methacrylates or monomers or/and oligomers, containing at least one ethylenically unsaturated group. Reference is made to WO2008/061930 (page 8 to 35).

The curable composition is preferably curable by means of an ultraviolet (U.V.) light or an electron beam. The curable composition can be coloured.

The (polymer) layer comprising a luminescent material (waveguiding layer) on the medium having a low index of refraction $n_{low}$ is preferably made of a curable lacquer, which may be cured by actinic radiations, preferably ultraviolet (U.V.) light or electron beam. Reference is made to WO2008/061930 (page 8 to 35).

The curable compositions are preferably deposited by means of gravure or flexographic printing.

The diffraction grating may be formed using any methods known to the skilled man such as those described in U.S. Pat. No. 4,913,858, U.S. Pat. No. 5,164,227, WO2005/051675 and WO2008/061930.

Furthermore, it would be advantageous to form the diffraction gratings in register directly on the substrate.

In said embodiment, the substrate may comprise any sheet material. The substrate may be opaque, substantially transparent or translucent, wherein the method described in WO08/061,930 is especially suited for substrates, which are opaque to UV light (non-transparent). The substrate may comprise paper, leather, fabric such as silk, cotton, tyvac, filmic material or metal, such as aluminium. The substrate may be in the form of one or more sheets or a web.

The substrate may be mould made, woven, non-woven, cast, calendared, blown, extruded and/or biaxially extruded.

The substrate may comprise paper, fabric, man made fibres and polymeric compounds. The substrate may comprise any one or more selected from the group comprising paper, papers made from wood pulp or cotton or synthetic wood free fibres and board. The paper/board may be coated, calendared or machine glazed; coated, uncoated, mould made with cotton or denim content, Tyvac, linen, cotton, silk, leather, polythyleneterephthalate, polypropylene propafilm, polyvinylchloride, rigid PVC, cellulose, tri-acetate, acetate polystyrene, polyethylene, nylon, acrylic and polytherimide board. The polythyleneterephthalate substrate may be Melienex type film orientated polypropylene (obtainable from DuPont Films Willimington Delaware product ID Melinex HS-2).

The substrate may comprise papers and board made from wood pulp or cotton or synthetic wood free fibres. The paper/board may be coated, calendared or machine glazed.

The substrates being transparent filmic or non transparent substrates like opaque plastic, paper including but not limited to banknote, voucher, passport, and any other security or fiduciary documents, self adhesive stamp and excise seals, card, tobacco, pharmaceutical, computer software packaging and certificates of authentication, aluminium, and the like.

In a preferred embodiment of the present invention the substrate is a non-transparent (opaque) sheet material, such as, for example, paper. In another preferred embodiment of the present invention the substrate is a transparent sheet material, such as, for example, polythyleneterephthalate.

The security devices may be used in the fields of authentication, identification, and security, for a variety of purposes like (but not restricted to) banknotes, credit cards, passports, tickets, document security, anti-counterfeiting, brand protection and the like.

For most applications, additional protective coatings are useful and are thus preferred. An additional function of the covering layer is to hamper attempts to analyze the diffractive microstructure.

In a further embodiment, the present invention provides security elements, as described herein, which are in the form of hot or cold transferable labels, adhesive tags, and the like.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLES

Example 1

Rectangular gratings of 270 nm period with 140 nm depth are copied in an UV curable Ormocomp® material (commarcially available from Microresist Technology GmbH, Germany).

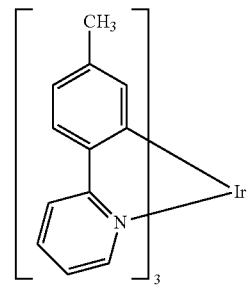

(9% by weight) and polyvinylcarbazole (91% by weight) are previously dissolved in tetrahydrofuran (THF) and then mixed together at appointed weight ratio. Then the grating copy is spin coated by luminescent solution. The thickness of the luminescent layer is 130 nm.

The luminescent material is illuminated by collimated UV light perpendicularly to sample surface [UV LED from Nichia having an emission peak at 365±5 nm; UG11 filter rejected UV light up to 400 nm; 25.6 µW/cm² power density; measurement time: 30 s; Spectroradiometer SpectraScan PR-705 measured photoluminescence spectrum in visible region 400-780 nm; angle between an illumination beam and measuring direction varied from 30° to 60°].

The emission intensity depends on the observation angle, reaching the highest level at 60°. FIG. 3 is a plot of the measured emission intensity versus wavelength at a viewing angle of 60°. The emission intensity was measured for one emitting material, i.e.

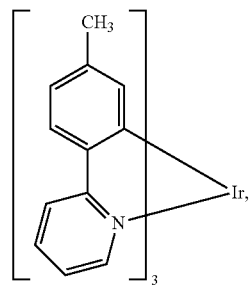

embedded in two different matrix materials of the waveguiding layer, namely PVK and PMMA. Further it was measured for the two different orientations of the used linear diffraction grating, namely viewing direction horizontal or vertical to grating lines.

Accordingly, a logo having a "grating-no grating" structure should provide high contrast. Further a logo "grating horizontal-grating vertical" should provide a recognisable contrast and a distinct fluorescence colour change upon rotation. FIGS. 4a and 4b show schematically this effect for a logo and an image, respectively. Of course the gratings do not need to be rotated by 90°, but it is expected that the contrast is maximised in this case. Gratings which are rotated by less than 90° can produce a recognisable contrast as well. The gratings should be rotated to each other by at least 20°. Preferred they are rotated by at least 30°, especially preferred by at least 45° and particularly preferred by at least 60°.

Example 2

Photoluminescence Versus Thickness of Polyvinylcarbazole Doped by

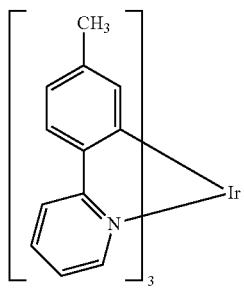

Emission intensity of 9% by weight

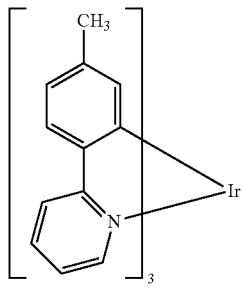

and 91% by weight polyvinylcarbazole on a Ormocomp grating copy is measured for different thicknesses of fluorescent material from 42 to 1000 nm. Thickness is changed by spin coating speed and solution viscosity by adding of THF solvent.

The highest total emission corresponds to 1000 nm thickness. Nevertheless the best contrast for the "grating horizontal-grating vertical"—or more generally two rotated gratings—case is achieved with a thickness of about 150 nm.

Example 3

A clear ultraviolet activated primer [(1-methyl-1,2-ethanediyl)bis[oxy(methyl-2,1-ethanediyl)]diacrylate (1-20%), poly(oxy-1,2-ethanediyl), α-hydroxy-[(1-oxo-2-propen-1-yl)oxy]-, ether with 2-ethyl-2-(hydroxymethyl)-1,3-propanediol (3:1) (10-50%), oligo[2-hydroxy-2-methyl-1-[4-(1-methylvinyl)phenyl]propanone] (1-5%), oxybis (methyl-2,1-ethanediyl) diacrylate (30-45%)] (91% by weight), provided by BASF, is doped with

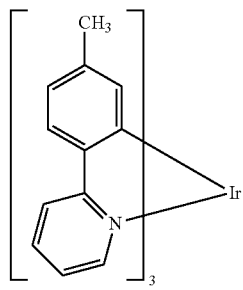

(9% by weight) in THF. This solution is coated by droplets on a borofloat glass and on rectangular grating (Ormocomp copy) of 270 nm period and 140 nm depth. The solution is UV cured. The peak maximum of emission is at a wavelength of 462 nm.

Encapsulation of luminescent material coated on a rectangular grating by Ormocomp® (commercially available from Microresist Technology GmbH, Germany) and Boroafloat glass shifts the emission maximum to 420 nm and 466-468 nm.

Ratio of emission intensity between UV primer and

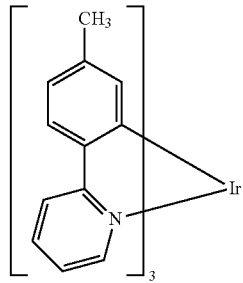

coated on a rectangular grating and flat surface is 30-50 times. Encapsulation increases this ratio up to 100 times. It can provide high contrast of logo produced on a base of structure "grating-no grating".

Example 4

Rectangular gratings of 270 nm period with 140 nm depth are UV casted in clear ultraviolet activated primer [(1-methyl-1,2-ethanediyl)bis[oxy(methyl-2,1-ethanediyl)]diacrylate (1-20%), poly(oxy-1,2-ethanediyl), α-hydroxy-[(1-oxo-2-propen-1-yl)oxy]-, ether with 2-ethyl-2-(hydroxymethyl)-1,3-propanediol (3:1) (10-50%), oligo[2-hydroxy-2-methyl-1-[4-(1-methylvinyl)phenyl]propanone] (1-5%), oxybis (methyl-2,1-ethanediyl)diacrylate (30-45%)] (91% by weight) by gravure printing using a Nickel shim. Rectangular gratings are overcoated by the means of a 6 micron wireround bar coater with an ink containing 2% phtalimidine dye by weight and 1% Nitrocellulose binder in ethylacetate and methoxypropanol or with an ink containing 2 phthalimidine dye by weight and 3% vinyl chloride and vinyl acetate copolymer in methyl ethyl ketone.

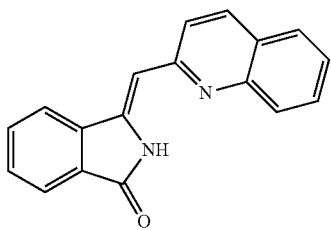

The best contrast for the "grating horizontal-grating vertical"—or more generally two rotated gratings—case is achieved with a thickness of about 150 nm.

The invention claimed is:

1. A security device comprising:

a medium, or a substrate having a low index of refraction $n_{low}$;

a waveguiding layer having a high index of refraction $n_{high}$ and comprising a luminescent material; and a diffractive microstructure on a surface of the waveguiding layer, at an interface between the medium or the substrate and the waveguiding layer, or at a distance smaller than 500 nm from the waveguiding layer, wherein a refractive index difference between the medium or the substrate and the waveguiding layer is at least 0.005;

a microstructure period is from 100 to 1500 nm;

a mass thickness of the waveguiding layer is from 30 to 1000 nm; and a microstructure depth is from 50 to 1000 nm, wherein the waveguiding layer further comprises a matrix material and said matrix material is selected from the group consisting of a polyvinylcarbazole, a polymethylmethacrylate, a UV primer, a vinyl chloride copolymer, a vinyl acetate copolymer, and a nitrocellulose;

wherein the luminescent material is at least one selected from the group consisting of a metal complex, a fluorescent organic dye, a fluorescent polymer, and a substituted phthalimidine dye; and wherein the metal complex is at least one selected from the group consisting of

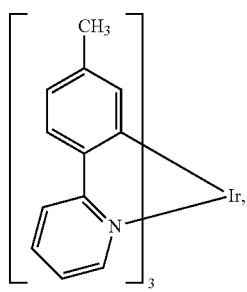

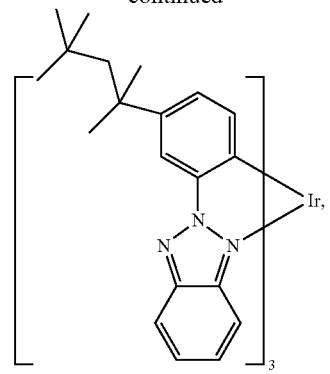

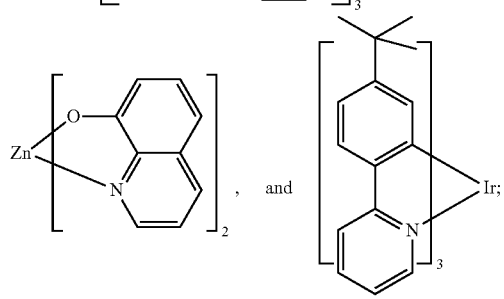

the fluorescent organic dye is

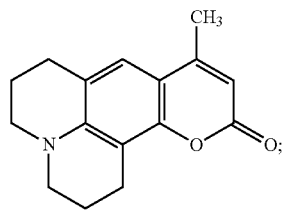 [SMILES: Cc1cc(=O)oc2c3c4c(cc12)CCCN4CCC3]

the fluorescent polymer is

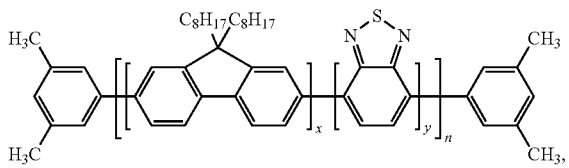

wherein x is 0.90 and y is 0.10; and the substituted phthalimidine dye is

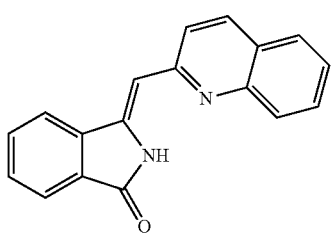

2. The security device of claim 1, comprising:
a layer of the medium having a low index of refraction $n_{low}$;
the diffractive microstructure on the medium;

the waveguiding layer on the diffractive microstructure; or
a layer of the medium having a low index of refraction $n_{low}$;
the waveguiding layer on the medium;
the diffractive microstructure on the waveguiding layer.

3. The security device of claim 2, wherein the security device comprises:
a layer of the medium having a low index of refraction $n_{low}$;
the diffractive microstructure on the medium; and
the waveguiding layer on the diffractive microstructure.

4. The security device of claim 3, further comprising a second layer of a medium having a low index of refraction $n_{low}$.

5. The security device-of claim 1, wherein the medium is at least one selected from the group consisting of polymethylmethacrylate, polycarbonate, and polyethylenetherephatalate, each coated with an embossable layer.

6. The security device of claim 1, wherein
the diffractive microstructure is a diffraction grating having a microstructure period of 270±30 nm;
the thickness of the waveguiding layer is 140±50 nm; and
the microstructure depth is 140±30 nm.

7. The security device of claim 1, wherein the diffractive microstructure comprises at least two part-areas adjacent or nearby to one another, wherein one part-area comprises one grooves orientation and the other part-area comprises another different grooves orientation, one part-area comprises one grating period and the other part-area comprises another different grating period, or both.

8. The security device of claim 7,
wherein
both part-areas comprise a logo in the diffractive microstructure,
upon irradiation of the luminescent material a first logo appears bright and a second logo appears dark depending on the orientation of the grooves, and
upon rotation the first logo appears dark and the second logo appears bright.

9. The security device of claim 8, wherein the part-areas have a defined shape.

10. The security device of claim 9, wherein the part-areas have a defined shape selected from the group consisting of a symbol, a stripe, a geometrical shape, a design, lettering, and an alphanumeric character, or a representation of an object or parts thereof.

11. A process for manufacturing the security device of claim 1, the process comprising:
forming a diffractive microstructure in a medium having a low index of refraction $n_{low}$ by embossing; and
depositing a waveguiding layer having a high index of refraction $n_{high}$ and comprising a luminescent material on the diffractive microstructure.

12. The process of claim 11, wherein all deposition steps are part of a roll-to-roll process.

13. The process of claim 11, further comprising depositing a second layer of a medium having a low index of refraction $n_{low}$ on the waveguiding layer.

14. A process for manufacturing the security device of claim 1, comprising depositing a waveguiding layer having a high index of refraction $n_{high}$ and comprising a luminescent material on a medium having a low index of refraction $n_{low}$; and
forming a diffractive microstructure on the waveguiding layer by embossing.

15. The process of claim 14, further comprising depositing a second layer of a medium having a low index of refraction $n_{low}$ on the waveguiding layer.

16. The security device of claim 1, wherein the security device is suitable for manufacturing of banknotes, credit cards, passports, and tickets, and for brand protection.

17. A product comprising the security device of claim 1.

18. The security device of claim 1, wherein
the diffractive microstructure is on a surface of the waveguiding layer, at an interface between the medium or the substrate and the waveguiding layer, or at a distance smaller than 200 nm from the waveguiding layer,
the refractive index is at least 0.01;
the mass thickness is from 50 to 400 nm; and
the microstructure depth is from 80 to 600 nm.

19. The security device of claim 1, wherein the security device comprises:
a layer of the medium having a low index of refraction $n_{low}$;
the waveguiding layer on the medium; and
the diffractive microstructure on the waveguiding layer.

20. The security device of claim 19, further comprising a second layer of a medium having a low index of refraction $n_{low}$.

21. The security device of claim 1, wherein the substrate has a refractive index at a wavelength of about 300 to 500 nm in the range of 1.35 to 1.80.

22. The security device of claim 1, wherein the substrate has a refractive index at a wavelength of about 300 to 500 nm in the range of 1.49 to 1.59.

23. The security device of claim 1, wherein the luminescent material comprises at least one metal complex selected from the group consisting of

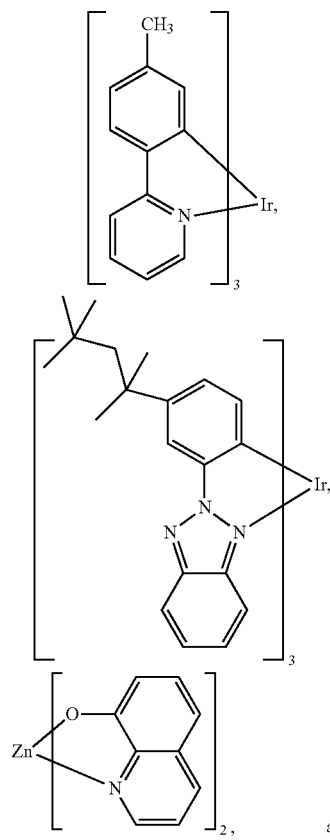

and

-continued
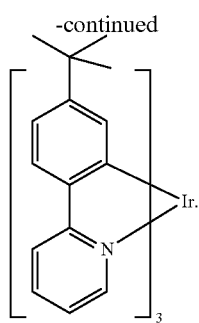
24. The security device of claim 1, wherein the luminescent material comprises the fluorescent organic dye
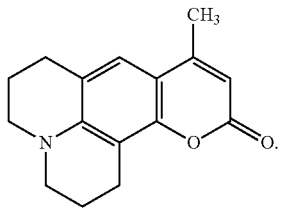 [SMILES: Cc1cc(=O)oc2c3c4c(cc12)CCCN4CCC3]
25. The security device of claim 1, wherein the luminescent material comprises the fluorescent polymer
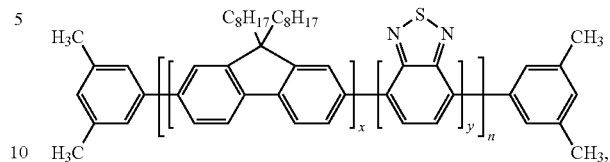
wherein x is 0.90 and y is 0.10.
26. The security device of claim 1, wherein the luminescent material comprises the substituted phthalimidine dye
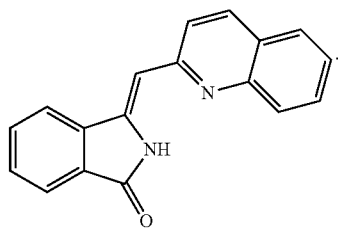 [SMILES: O=C1N/C(=C\c2ccc3ccccc3n2)c2ccccc21]
* * * * *